(12) United States Patent
Crorey

(10) Patent No.: US 7,434,327 B2
(45) Date of Patent: Oct. 14, 2008

(54) CEILING LOCATING DEVICE

(76) Inventor: David J. Crorey, 44265 Riverview Ridge Dr., Clinton Township, MI (US) 48038

( * ) Notice: Subject to any disclaimer, the term of this patent is extended or adjusted under 35 U.S.C. 154(b) by 0 days.

(21) Appl. No.: 11/682,376

(22) Filed: Mar. 6, 2007

(65) Prior Publication Data

US 2008/0216335 A1   Sep. 11, 2008

(51) Int. Cl.
*G01B 7/00* (2006.01)
*B25H 7/00* (2006.01)

(52) U.S. Cl. ................. 33/528; 33/DIG. 10; 33/DIG. 1

(58) Field of Classification Search .............. 33/528, 33/DIG. 1, DIG. 10
See application file for complete search history.

(56) References Cited

U.S. PATENT DOCUMENTS

| | | | |
|---|---|---|---|
| 1,719,812 A | | 7/1929 | Shaw et al. |
| 1,971,189 A | | 8/1934 | Leibing |
| 3,722,360 A | | 3/1973 | Blakey et al. |
| 3,723,928 A | | 3/1973 | Blakey et al. |
| 4,096,964 A | * | 6/1978 | Glick ........................ 33/528 |
| 4,359,302 A | * | 11/1982 | Payne ................... 33/DIG. 10 |
| 4,384,396 A | | 5/1983 | Smolik |
| 4,388,890 A | | 6/1983 | Wester et al. |
| 4,901,447 A | | 2/1990 | Gottschalk |
| 5,117,720 A | | 6/1992 | Bussi |
| 5,172,483 A | | 12/1992 | Yocono, Sr. et al. |
| 5,203,818 A | | 4/1993 | Kuiper ........................ 52/484 |
| 5,348,274 A | | 9/1994 | Breen |
| 5,434,500 A | | 7/1995 | Hauck et al. |
| 5,615,490 A | | 4/1997 | Burchell |
| 5,711,082 A | | 1/1998 | Olivo |
| 6,201,396 B1 | | 3/2001 | Matsuo et al. |
| 6,403,883 B1 | | 6/2002 | Morgan et al. |
| 6,452,097 B1 | | 9/2002 | DeWall |
| 6,511,269 B1 | * | 1/2003 | Smasne ........................ 33/528 |
| 6,708,421 B1 | * | 3/2004 | Crorey ........................ 33/528 |
| 7,273,332 B2 | * | 9/2007 | Rivers et al. ............... 33/355 R |

FOREIGN PATENT DOCUMENTS

| | | |
|---|---|---|
| JP | 5-331957 | 12/1993 |
| JP | 6-257251 | 9/1994 |
| KR | 20-0388553 | 6/2005 |

* cited by examiner

*Primary Examiner*—Christopher W Fulton
(74) *Attorney, Agent, or Firm*—Young Basile

(57) ABSTRACT

A locating device for locating the centerpoint of a body such as a recessed light fixture behind a ceiling. The device includes an extendable first member connectable in the center of the body and a second member positionable on the outer surface of the ceiling. A magnet positioned in the first member cooperates with a magnet positioned in the second member to maintain the second member in an aligned position with the center of the body. The extendable first member accommodates various size bodies so that the magnet positioned in the first member extends to the ceiling for attraction to the magnet positioned in the second member.

9 Claims, 2 Drawing Sheets

CEILING LOCATING DEVICE

FIELD OF THE INVENTION

The invention relates to an apparatus and method for locating a device behind a wall or ceiling.

BACKGROUND OF THE INVENTION

During the construction of buildings and structures, object or bodies are fixedly associated or rigidly mounted with respect to structural frame members such as wood or metal studs. After the bodies are mounted to the structural frame members, sheet material such as drywall, paneling or plywood is placed over the structural members, concealing the bodies mounted to the structural members. Before the building or structure is complete, the sheet material must be cut or pierced to expose the bodies. Generally, the bodies are used for communicating electricity to or as light fixtures predetermined locations in the building.

SUMMARY OF THE INVENTION

The invention provides a locating device for finding a perimeter of a body allegedly positioned behind a sheet of material, such as a recess light mounted to a stud in position behind a sheet of drywall, paneling or ceiling material. In one aspect of the invention, the apparatus includes a first assembly having a magnet wherein the first assembly is securable to a center socket internal with respect to the body. The first assembly has adjustable means for adjusting the length of the first assembly with respect to the socket. The apparatus also includes a second assembly positionable on an outer surface of the sheet of material adjacent to the body. The second assembly has a magnet having an opposite polarity of the magnet of the first assembly.

In another aspect of the invention, the first assembly of the apparatus includes a stationary member having one end fixable to the socket and a movable member defining the adjustable means. The movable member is movable relative to the stationary member.

In yet another aspect of the invention, the stationary member is a tubular shaft member having an inner surface, having at least one depression formed therein. The movable member is a tubular shaft member having an exterior surface having at least one projection extending therefrom or receiving the at least one projection of the stationary member.

DETAILED DESCRIPTION OF THE PREFERRED EMBODIMENT

Figure 1:
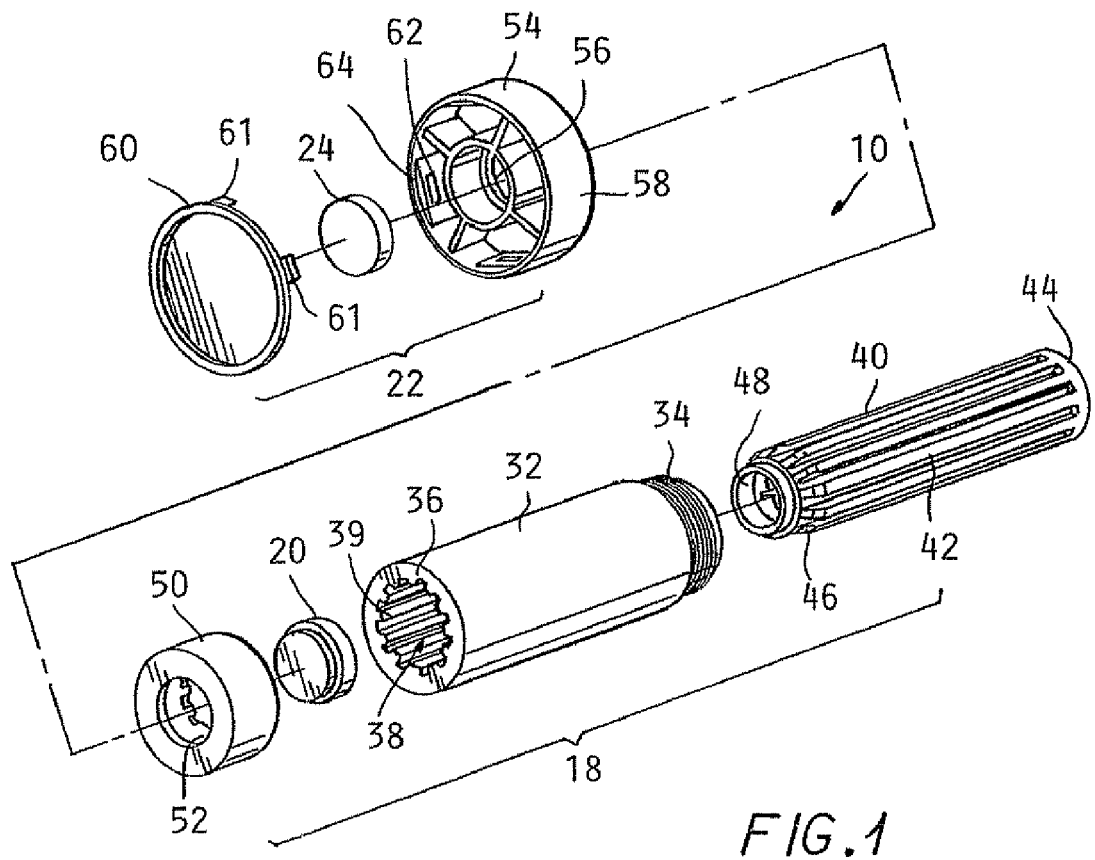
FIG. 1 is an exploded perspective view of the locating device according to the present invention.
Figure 2:
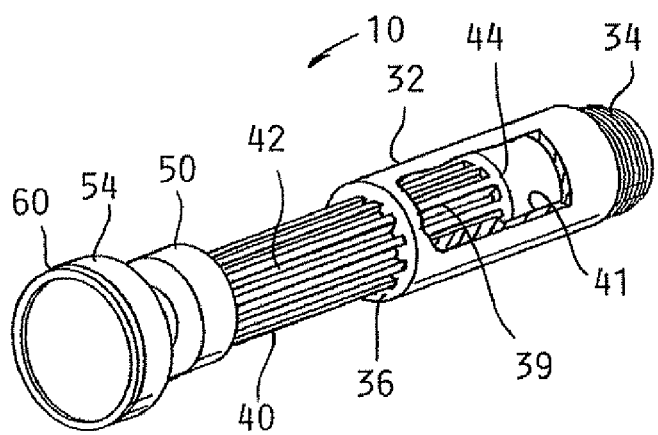
FIG. 2 is a perspective view of the assembled locating device shown in FIG. 1.

Referring to FIGS. 1 and 2, the invention provides a located device 10 for locating a perimeter of a body 14 with respect to an outer surface of a sheet of material wherein the body 14 is rigidly positioned behind the sheeted material 16. The locating device 10 includes a first assembly 18 positionable internal with respect to the body 14 and having a magnet 20 connected thereto. The locating device also includes a second assembly 22 positionable on an outer surface of the sheet of material 16 adjacent to the body 14. The second assembly 22 includes a magnet 24 having an opposite plurality as the magnet 20 of the first member. The magnet 20 of the first assembly 18 cooperates with the magnet 24 of the second number 22.

Figure 3:
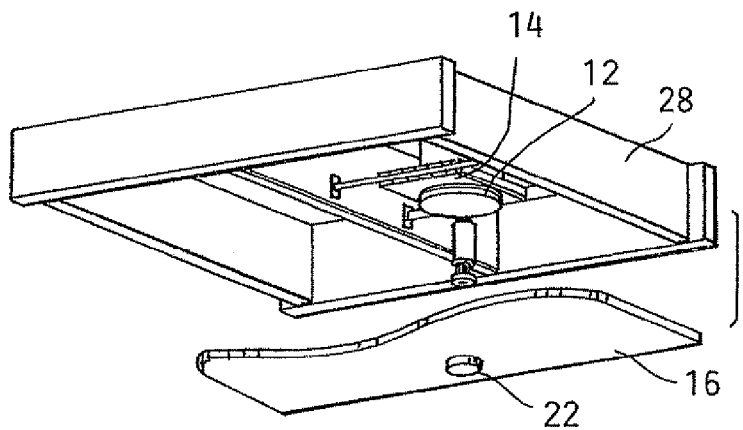
FIG. 3 is a perspective view of the locating device installed in a ceiling structure.
Figure 4:
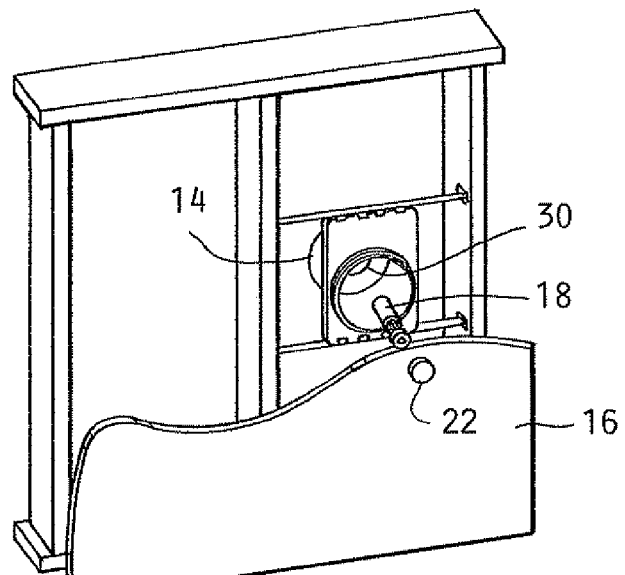
FIG. 4 is a perspective view of the locating device installed in the ceiling structure illustrating certain other feature.

Referring now to FIGS. 3 and 4, the body 14 is rigidly positioned or immovably associated with a structural member 28, such as a ceiling. The body 14 is positioned behind a sheet 16 of material. The sheet 16 defines a ceiling that can be formed from drywall, paneling, or ceiling squares. The locating device 10 of the present invention is advantageously used for locating recessed light fixtures 14. The recessed light fixtures 14 are generally circular in having a center socket 30 for receiving a light bulb. The socket 30 defines the center of the peripheral edge 12 of the fixtures 14. The socket 30 generally has interior threads (not shown) for threading a light bulb therein.

The first assembly 18 as shown in FIGS. 1 and 2 include a first hollow shaft member 32 having a first end threaded 34 and sized for threading into the socket 30. The first hollow shaft member 32 has a second opposing end 36 that is opened to a hollow interior 38. The hollow interior 38 is sized and configured for receiving a tubular member 40. The hollow interior 38 is splined 39 along a portion of its axial length.

The first assembly 18 also includes the tubular member 40 sized and configured for disposition within the hollow interior 38 of the first hollow shaft member 32. The tubular member 40 has a splined exterior surface 42. The tubular member 40 has an overall diameter slightly smaller than the inner diameter of the first hollow shaft member 32 so that the outer splined peripheral surface 42 of the tubular member 40 can be received within the splined hollow interior 38 of the first hollow shaft 32; and further so that the splined surface of the first hollow shaft member 32 meetingly mesh with the splined surface of the tubular member 40. As a result, the tubular member 40 cannot rotate relative to the first hollow shaft member 32 when the first hollow shaft member 32 is fixed into the socket 30.

The splined surfaces 39, 42 permit the two members 32 and 40 of the first assembly 18 to move axially or end wise in relation to each other. This configuration allows changes in the length of the first assembly 18 to accommodate various dimensions of recess light fixtures 14. It is known that recess lighting features are available in difference sizes. The different sizes of the recess lighting fixtures affect the distance from the socket 30 to the ceiling member 16. Therefore it is advantageous for a locating device to have a movable member 40 that will allow the first assembly 18 to lengthen so that the first magnet 20 is always positioned adjacent the ceiling material 16.

The tubular member 40 has a first end 44 configured for maintaining the tubular member 40 within the axial length of the first hollow shaft member 32. The tubular member 40 has an opposing second end 46 having an opening 48 for receiving the first magnet 20. The magnet 20 may be connected to the tubular member 40 within the opening 48 by various conventional means including adhesive, clips, or threading the magnet 20 within the opening 48. A housing 50 snaps onto the tubular member 40 and is secured over the magnet 20 in the end portion 48 of the tubular member 40. The housing 50 has a center through aperture 52 so that the magnet 20 is exposed therefrom.

The second assembly 22 in the illustrated embodiment includes a two part housing for the second magnet 24. The housing includes a short tubular member 54 and a disc-shaped member 60. The short tubular member 54 has a central through opening 56 sized for receiving the magnet 24. The through opening 56 is smaller at one end 58 to prevent the magnet 24 from falling therethrough. The opening 56 at end 58 allows the magnet 24 to sit essentially flush with the end 58 surface of the short tubular member 54. Once the magnet 24 is installed within the short tubular member 54, the disc-shaped member 60 has projections 61 that snap into apertures 62 formed along inner peripheral edge of the short tubular member 54. The apertures 62 may be provided in small plates 64 secured and spaced along the inner peripheral edge of the short tubular member 54.

FIG. 2 shows the locating device 10 in an extended position, wherein the tubular member 40 is at least partially exposed from the first hollow shaft member 32. Although the second tubular member 40 extends from the second end 36 of the hollow interior 38, the locating device 10 is assembled by installing the tubular member 40 into the hollow interior 38 of the first hollow shaft member 32 inserting the second end 46 of a second member 40 through the first end 34 of the first hollow shaft member 32. The hollow interior 38 of the first hollow shaft member 32 has a splined portion 39 only extending a portion of its axial length starting at the second end 36. The smooth portion 41 of the hollow interior 38 has a diameter essentially equal to the diameter of the splined portion 39 at the depression of the hollow interior 38. As can be seen in FIG. 1, the first end 44 of the tubular member 40 is smooth and has a diameter that is slightly smaller than the smooth 41 diameter of the hollow interior 38 of the first hollow shaft member 32. Therefore as the tubular member 40 is moved through the hollow interior 38 from the first end 34, the smooth end 44 of the tubular member 40 is stopped by the projections forming the splines 39 in the hollow interior 38. This limits the axial movement of the tubular member 40 relative to the first hollow shaft member 32; and further prevents the tubular member 40 from falling out of the first hollow shaft member 32 when the locating device 10 is secured to a socket 30. Once the second end 46 of the tubular member 40 is exposed, the magnet 20 can be inserted into the hollow interior 38 at the second end 46 of the tubular member 40. The cap/housing 50 is then secured to the second end 46 of the tubular member 40 and over the magnet 20 allowing the magnet 20 to be exposed through the aperture 52.

As shown in FIGS. 3 and 4, a single assembly 18 can be secured to a socket 30 of the body 14. The typical way for attaching the first assembly 18 to the socket is to threadably secure the first end 34 of the first hollow shaft member 32 to the threads provided in the socket. Other methods for attaching the first assembly 18 to the socket are via clips, clamps, a frictional plug etc. With the first assembly 18 in a vertical direction the tubular member 40 can slide out of the first hollow shaft member 32 via gravity to its fully extended length. When the sheet of material 16 for the ceiling is installed under the body 14, the sheet of material 16 pushes a portion of the tubular member 40 back into the interior cavity 38 of the first hollow shaft member 32 so that the magnet 20 rests on the upper surface of the ceiling material 16.

With the ceiling fully installed, the location of the first assembly 18 of the locating device 10 is hidden from view. The second assembly 22 is positionable on the outer surface of the sheet material 16 and adjacent the body 14 and magnet 20 of the first assembly. The magnets 20 and 24 cooperate in that one of the magnets exposed toward the ceiling sheet 16 has a "north" pole, or a positive plurality, and the other of the magnets exposed toward the ceiling sheet 16 has a "south" pole, or a negative plurality. The magnets 20, 24 cooperate such that the second assembly 22 is suspended on the ceiling sheet 16 by the magnetic attraction between the magnets 20, 24.

Figure 5:
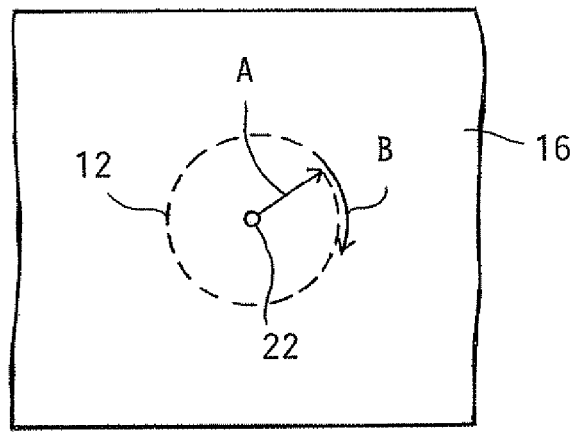
FIG. 5 is a schematic illustrating the drilling process to expose a recess fixture with the locating device.

Looking at FIG. 5, the center mark of the body 14 can then be used to find the perimeter of the body 14 for cutting or piercing the ceiling material 16 to expose the circular body 14 and socket 30. The drill or piercing tool is placed adjacent the second assembly 22 and cuts outwardly from the center as shown by arrow "A". When the drill or piercing tool contacts the inner perimeter of the body 14 the drill is then moved over to the outside perimeter of the body 14 and then continues drilling along the outside periphery 12 of the body 14. The outside drilling procedure is shown by arrow "B". The drill or piercing tool continues to follow the path around the outside perimeter of the body 14 until the entire area covering the body 14 interior is exposed.

The locating device 10 of the present invention has the advantages of providing a compact tool that is easily attachable to a socket 30 of a light fixture 14 and which accommodates various sizes of lighting fixtures 14 during a room or building construction. The locating device 10 provides an easy means for finding the peripheral edge 12 of the fixture 14 for properly cutting the ceiling material 16 to the exact dimension of the light fixture of the fixture 14. Although the fixture 14 is shown having a circular peripheral edge, it is evident that the locating device 10 can be used on fixtures having rectangular, as well as other shapes.

While the invention has been described in connection with what is presently considered to be the most practical and preferred embodiment, it is to be understood that the invention is not to be limited to the disclosed embodiments but, on the contrary, is intended to cover various modifications and equivalent arrangements included with the spirit and scope of the appended claims, which scope is to be accorded the broadcast interpretation so as to encompass all such modifications and equivalent structures as is permitted under the law.

What is claimed is:

1. An apparatus for locating a perimeter of a body having a socket with respect to an outer surface of a sheet of material wherein the body is rigidly positioned behind the sheet of material, comprising:

a first tubular hollow shaft connectable to the socket at a first end and open at an opposing end, said first tubular shaft having an interior surface with a smooth portion adjacent to the first end and a splined portion commencing at the open opposing end and terminating at the smooth portion;

a second tubular shaft having a first end with a smooth outer axial edge, a second opposing end and a splined exterior surface extending between the smooth outer axial edge and the second end, the second tubular shaft configured for disposition in the first tubular hollow shaft and movable relative to the first hollow shaft;

a first magnet connected to the second end of toe second shaft; and a second magnet of opposite polarity positionable on an outer surface of the sheet of material adjacent the body.

2. The apparatus of claim 1, wherein the socket has a threaded interior surface and the first end of the first hollow shaft has a complementary threaded surface on an exterior surface.

3. The apparatus of claim 1, wherein the splines of the splined portion in the first tubular shaft and the splined exterior surface of the second tubular shaft are parallel to the axial length of the first hollow shaft.

4. The apparatus of claim 1, wherein the second shaft is configured and disposed coaxially within said first hollow shaft for axial movement relative thereto.

5. The apparatus of claim 4, wherein the smooth axial edge of the second tubular shaft defines a stop means for preventing the second shaft from falling away from the first hollow shaft when assemble to the socket when the smooth outer axial edge contacts the splined portion of the first tubular shaft.

6. An apparatus for locating a perimeter of a body wherein the body has a center socket and is rigidly secured behind a sheet of material, said apparatus comprising:

a first assembly connectable to the socket and a second assembly connectable to the first assembly;

said first assembly comprising:

a first tubular shaft having a through inner bore, said first tubular shaft having a first end configured for disposition in and connection to the socket and an opposing opened second end, said inner bore having splines running parallel to the axial length of the first tubular shaft, said splines beginning at the opened second end and extending a portion into the inner bore, said splines terminating at a smooth inner bore portion, said smooth inner bore portion extending to the first end;

a second tubular shaft having a first end with a smooth outer axial edge and a second opposing end and a splined exterior surface extending between the smooth outer axial edge and the second end, the splined exterior surface of the second tubular shaft configured to be disposed and axial move in the first tubular shaft, wherein the splines on the second shaft intermesh with the splines in the first shaft and the smooth outer axial edge is configured to stop at the splines in the inner bore of the first tubular shaft;

a first magnet connected to the second end of the second shaft; and a housing snapped over the first magnet onto the second end of the second shaft securing the first magnet onto the second tubular shaft, said housing having a center, through aperture exposing the first magnet, said second assembly comprising a second magnet magnetically attracted to the first magnet.

7. The apparatus of claim 6, wherein the splines of the first tubular member define a stop of the axial movement of the second tubular shaft when the smooth outer axial edge contacts the splines of the first tubular member.

8. The apparatus of claim 6, wherein the second assembly further comprises a housing for the second magnet, the housing including a tubular member having a through opening for receiving the second magnet, wherein the opening at one end is smaller than the second magnet, said housing having a plurality of apertures spaced along inner edges of the tubular member; and a disc-shaped cover to the housing, said disc-shaped cover having complementary projections for securing into the plurality of apertures.

9. The apparatus of claim 6, wherein the body is located in a ceiling and the sheet of material is ceiling material and the second shaft moves relative to the first shaft via the force of gravity when the first assembly is connected to the socket.

\* \* \* \* \*